United States Patent Office 3,335,317
Patented Aug. 8, 1967

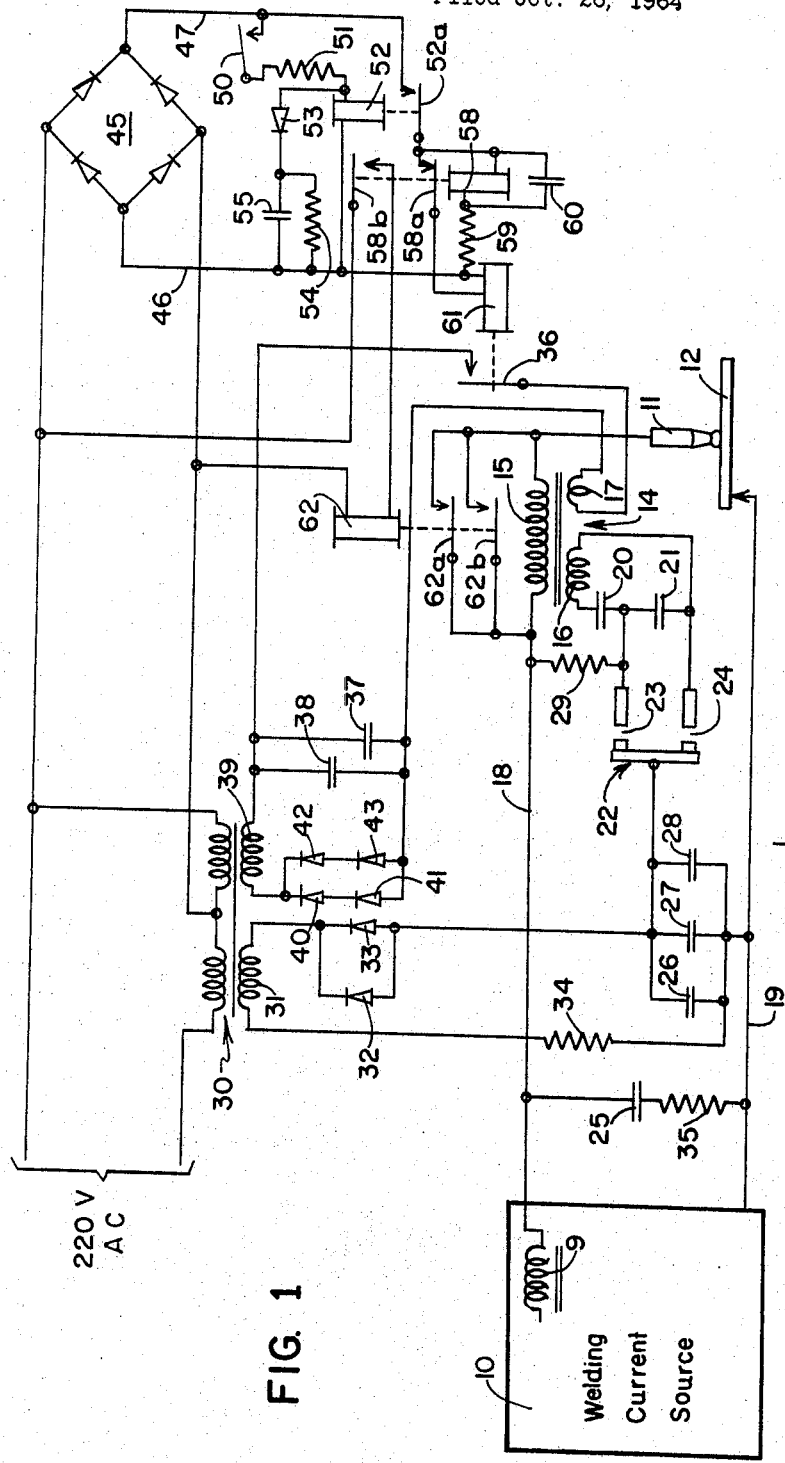

3,335,317
ARC STARTING CIRCUIT FOR WELDING
SYSTEM
Albert M. Sciaky, Palos Park, Ill., assignor to Welding Research, Inc., Chicago, Ill., a corporation of Illinois
Filed Oct. 26, 1964, Ser. No. 406,531
9 Claims. (Cl. 315—171)

This invention relates generally to welding systems, and more particularly to a system for initiating a welding arc between an electrode and a workpiece at a precise time.

In the operation of automatic arc welding systems, it is desired that the welding arc continue for a given time duration so that the weld will have the required characteristics. This is important in spot welding, for example, so that the various spot welds are of desired uniform construction. In order to do this it is necessary that the arc be started at a precise instant. This, however, presents a problem as various conditions, such as irregularities on the piece to be welded, affect the instant of firing of the arc in response to the voltage applied to the welding electrode.

In some welding systems, the electrode is moved into contact with the workpiece to initiate the arc, but this requires a mechanically operating mechanism to move the electrode into and out of engagement with the workpiece each time the arc is established. It is therefore desired to provide a system which requires no mechanical movement. Arc starting systems which provide a very high voltage at the welding electrode to insure starting of the arc at a precise time are described and claimed in co-pending applications of Marcel R. Sommeria issuing as patents Nos. 3,154,719 and 3,154,721, on Oct. 27, 1964. These systems cooperate with the welding current source to provide an arc starting potential.

It is an object of the present invention to provide an improved electronic arc starting circuit for an arc welding system.

Another object of the invention is to provide an arc starting arrangement for a welding system which operates independently of the current source which provides the welding current after the arc is initiated.

A further object of the invention is to provide an arc starting system wherein a high voltage pulse initiates the welding arc and causes the flow of supplementary current to establish the arc, so that current from the welding current source can continue the arc.

A feature of the invention is the provision of a circuit for starting a welding arc at a welding electrode, wherein a high voltage pulse is applied to initiate the arc and to break down a spark gap to apply current to the arc, so that current from a low voltage welding current source can flow through the arc to provide a welding operation.

A further feature of the invention is the provision of an arc starting circuit to be used in a welding system, wherein the welding current source is connected to the welding electrode through a winding of a transformer, with the transformer having a second winding coupled to a supplementary current supply and a third winding connected to a high voltage supply, and wherein a high voltage pulse applied to the third winding is coupled to the first winding to fire the welding arc, and to the second winding to actuate a switch which applies current to the electrode to establish the welding arc. The first winding may be shorted out after the arc is initiated so that current flows from the source directly to the welding electrode.

Another feature of the invention is the provision of an arc starting circuit for a welding system, which is coupled through a transformer to the circuit connecting the welding current source to the welding electrode, and which includes a first storage capacitor connected to the transformer for applying a high voltage pulse to the welding electrode for initiating an arc thereat, and a second storage capacitor connected to the circuit through a spark gap which is fired by a voltage pulse from the transformer to apply current to the arc. The starting circuit operates independently of the welding current source and may provide current flow in the same direction as the current from the welding current source.

The invention is illustrated in the drawings wherein:
FIG. 1 is a circuit diagram of the arc starting circuit; and
FIG. 2 is chart showing the voltage and current at the welding electrode in the circuit of FIG. 1.

The arc starting circuit of the invention may be incorporated in an arc welding system wherein current from a welding current source is applied to a welding electrode and a workpiece to produce an arc therebetween. The arc starting circuit may be used in welding systems using either the metal inert gas (MIG) process and which have a consumable electrode, or in systems using the tungsten inert gas (TIG) process. The welding current source is connected to the electrode through a circuit including one winding of a three winding transformer. A second current supply, which may be provided by charged capacitors, is coupled to the circuit through a switching device such as a spark gap. The spark gap is connected to the second winding of the transformer and is fired by a voltage pulse thereform. The third winding of the transformer is coupled through a switch to a very high voltage supply, which may be also be provided by charged capacitors having a very high voltage. To start the arc at the welding electrode, a high voltage pulse is applied to the third winding and is coupled to the first and second windings. The voltage pulse in the first winding initiates an arc at the welding electrode, and the voltage pulse in the second winding fires the spark gap so that current is supplied to the arc. The high voltage pulse is sufficiently high to insure firing of the arc, but the current supplied is low so that the arc has high impedance. Current supplied through the spark gap to the electrode is at a potential to increase the arc so that the resistance of the arc decreases, and the desired welding current flows through the arc from the low voltage welding current source. The first winding of the transformer may be shorted out when the arc is initiated so that the transformer winding need not be capable of carrying the full welding current for a substantial period of time.

Referring now to the drawing, in FIG. 1 there is shown a welding current source 10 for providing welding current through an arc between welding electrode 11 and workpiece 12. The current source 10 may be any standard welding current source which provides a potential of the order of 75 volts, and will normally include a series choke 9 which prevents the application of high frequency pulses to the source proper. However, capacitor 25 and resistor 35 act as a by-pass for further protection. The welding system shown may be used for various different welding processes such as the MIG and TIG processes. The welding source 10 is connected to the welding electrode 11 through conductor 18 and winding 15 of transformer 14, and to the workpiece 12 through conductor 19. The transformer 14 has a second winding 16 and a third winding 17 inductively coupled to each other and to the winding 15.

Transformer winding 16 is connected to capacitors 20 and 21, and to the spark gap structure 22 which includes spark gaps 23 and 24. A plurality of capacitors 26, 27 and 28 are connected between conductor 19 and the spark gap structure 22. These capacitors are charged by current supplied through transformer 30 connected to AC supply. The secondary winding 31 of the transformer is connected through rectifiers 32 and 33 and resistor 34 to the capacitors 26, 27 and 28 to charge the same, to provide a voltage of the order of 200 volts, for example. The three capacitors and two rectifiers shown are representative of any number which may be required to provide the voltage and current needed in a particular application.

The transformer winding 17 is connected through relay contacts 36 to capacitors 37 and 38. The capacitors 37 and 38 are charged by a circuit including the secondary winding 39 of transformer 30, and rectifiers 40, 41, 42 and 43. The capacitors 37 and 38 may be charged to provide a potential of the order of 1000 volts. It is to be pointed out that the two capacitors 37 and 38 represent a plurality of capacitors, and the rectifiers 40 to 43 represent a plurality of rectifiers, as may be needed to provide the voltage and current required.

A control system is provided for the arc starting circuit including rectifier bridge 45 coupled to the AC source through transformer 30, for providing a direct current potential between conductors 46 and 47. Connected between the conductors 46 and 47 are operating switch 50, resistor 51, and relay 52. Bridged across the winding of relay 52 are rectifier 53 and the parallel circuit including resistor 54 and capacitor 55. This circuit delays the drop-out of the relay 52. Relay 52 has a contact 52a which operates to connect relay 58 in series with resistor 59 between the direct current conductors 46 and 47. Capacitor 60 is bridged across the winding of relay 58 to cause it to pull in slowly. Relay 58 includes contacts 58a and 58b, with contacts 58a being normally closed and connected in series with contacts 52a to connect relay 61 between the conductors 46 and 47. Contacts 36 which have previously been described are the contacts of relay 61. When relay 58 operates after a delay, contacts 58a open to de-energize relay 61 and open contacts 36. Contacts 58b of relay 58 close when relay 58 is actuated after a delay to energize relay 62 and close contact 62a and 62b to short out the winding 15. The two contacts 62a and 62b are connected in parallel and are representative of a plurality of contacts which may be required to carry the heavy current flowing from the welding current source 10 to the electrode 11.

Considering now the operation of the system, when switch 50 is closed, relay 52 operates and contacts 52a thereof close to operate relay 61. Relay 61 closes contacts 36 to apply the charge on capacitors 37 and 38, which may be 1000 volts, to the winding 17. Winding 17 may have a single turn and winding 15 may have about 15 turns so that the voltage pulse is stepped up to provide an extremely high voltage at electrode 11 to fire an arc between the electrode and the workpiece 12. Capacitor 25 and resistor 35 are bridged between conductors 18 and 19 to complete the circuit for the high voltage pulse, and to isolate the pulse from the welding current source 10. The choke 9 in the source further acts to block the high voltage pulse.

The high voltage pulse from winding 17 is also inductively coupled to winding 16. Winding 16 may have about 20 turns so that a very high voltage is developed therein which is applied to the two spark gaps 23 and 24 in series to fire the same. This connects the capacitors 26, 27 and 28 through spark gap 23 and resistor 29 between conductors 18 and 19. The capacitors discharge through the winding 15 and the arc established between electrode 11 and workpiece 12 to increase the current through the arc. Although an arc is initiated between electrodes 11 and 12 by the voltage pulse coupled from winding 17 into winding 15, this will be a very thin discharge because of the limited current applied. The current produced by the discharge of capacitors 26, 27 and 28 will act to reinforce the arc and reduce the resistance thereof. Accordingly, the welding current will flow from the welding current source 10 to the arc. The capacitors 26, 27 and 28 may be charged with a polarity to provide current flow in the same direction as the current from source 10.

When relay 58 operates after a time delay, contacts 58a thereof will de-energize relay 61 so that the winding 17 is disconnected from the capacitors 37 and 38, and these capacitors will charge for the next arc starting operation. The contact 58b of relay 58 will actuate relay 62 to close contact 62a and 62b. These will short out the winding 15 so that the welding current will flow from conductor 18 through the closed contacts 62a and 62b to the welding electrode 11. By shorting out the winding 15 after the arc is started, this winding need not have sufficient capacity to carry the full welding current for the full welding time.

The operation of the arc starting system is shown in FIG. 2. The voltage at the welding electrode 11 is shown by curve A. Before the arc is started, the voltage at the electrode is the voltage of the welding current source 10, which may be of the order of 75 volts. When the voltage pulse is applied from winding 17 to winding 15, a large negative spike is applied to electrode 11 to fire the arc between the electrode and the workpiece. The spark gaps 23 and 24 also fire at this time. When the arc is established, the voltage at the electrode 11 drops to a very small voltage, which is the voltage across the arc. Curve B of FIG. 2 shows the current flowing through the electrode 11. No current flows, of course, until the arc is initiated. The initial arc current is very low and builds up as the capacitors 26, 27 and 28 discharge. This reduces the resistance of the arc so that the full welding current flows. The shorting of the winding 15 does not substantially change the arc voltage or current, but as previously stated makes it possible to use a transformer with a winding 15 having smaller capacity, so that the cost of the transformer 14 is thereby reduced.

The arc starting system of the invention has been found to be very effective in actual use. The system may be used for various different welding processes. No special cooperation is provided between the starting system and the welding current supply so that the system can be used in many different applications.

I claim:

1. An arc starting circuit for use in a welding system which includes an electrode for producing an arc with a workpiece, and first and second current supply means, said arc starting circuit including in combination, first circuit means including inductor means for connecting the first current supply means to the electrode and the workpiece and providing a circuit from the first current supply means completed by an arc between the electrode and the workpiece, second circuit means including first switch means connecting the second current supply means to said first circuit means, said second circuit means being completed by operation of said first switch means to provide a circuit from the second current supply means to the electrode and the workpiece, third circuit means including coil means coupled to said inductor means and second switch means operable to energize said coil means to apply a voltage pulse to said inductor means, said inductor means applying the voltage pulse developed therein through said first circuit means between the electrode and the workpiece to initiate an arc therebetween, said first switch means including means coupled to said inductor means and responsive to said voltage pulse to complete a circuit through said second circuit means to apply current from the second current supply means to the welding electrode and the workpiece to increase the current flow through the arc initiated therebetween, and control means for operating said second switch means and including third switch means for bridging said inductor means after the arc is established, with the arc established at the electrode completing a path for current flow from the first current supply means through said third switch means.

2. The arc starting circuit of claim 1 wherein said first switch means includes a spark gap and a coil inductively coupled to said inductor means for applying a voltage across said spark gap to produce an arc thereat in response to the voltage pulse in said inductor menas to thereby complete a circuit through said second circuit means.

3. An arc starting system for initiating an arc between a welding electrode and a workpiece, and for completing a path thereto for current flow from a welding current source, said system including in combination, transformer means having first, second and third inductively coupled windings, first circuit means including said first winding for connecting the welding current source to the electrode and the workpiece and completing a circuit for applying welding current to an arc between the electrode and the workpiece, second circuit means connected to said first circuit means and including current supply means and a spark gap, said spark gap selectively connecting said current supply means to said first circuit means to apply current to an arc between the welding electrode and the workpiece, third circuit means including switch means connected to said third winding for providing current flow through said third winding to develop voltage pulses in said first and second windings, said first circuit means applying said voltage pulse in said first winding between the electrode and the workpiece to initiate an arc therebetween, said second winding being connected to said spark gap to produce an arc thereacross so that said second circuit means provides current flow from said current supply means through said spark gap to said first circuit means and through the arc between the welding electrode and the workpiece to increase the current flow therethrough.

4. An arc starting system in accordance with claim 3 including control means for operating said switch means, said control means having additional switch means connected across said first winding for bridging the same after the arc between the electrode and the workpiece has been established.

5. An arc starting system in accordance with claim 3 including control means having relay means for operating said switch means, additional switch means connected across said first winding for bypassing the same, and delay means controlled by said relay means for operating said additional switch means after the arc between the electrode and the workpiece has been established.

6. An arc starting system in accordance with claim 3 wherein said first circuit means includes an alternating current conducting circuit portion bypassing said welding current supply means.

7. A starting system for initiating an arc between a welding electrode and a workpiece, and for completing a path thereto for current flow from a welding current source, said system including in combination, transformer means having first, second and third inductively coupled windings, first circuit means including said first winding for connecting the welding current source to the electrode and the workpiece and completing a circuit for applying welding current to an arc between the electrode and the workpiece, second circuit means connected to said first circuit means and including current supply means and first switch means, said first switch means selectively connecting said current supply means to said first circuit means to apply current to an arc between the welding electrode and the workpiece, third circuit means including second switch means connected to said third winding for providing current flow through said third winding to develop voltage pulses in said first and second windings, said first circuit means applying said voltage pulse in said first winding between the electrode and the workpiece to initiate an arc therebetween, said second winding being connected to said first switch means to actuate the same so that said second circuit means causes current flow from said current supply means through said spark gap to said first circuit means and through the arc between the welding electrode and the workpiece to increase current flow therethrough, and control means for operating said second switch means and including third switch means connected across said first winding for bridging the same after the arc is established.

8. An arc starting system for initiating an arc between a welding electrode and a workpiece and for completing a path thereto for current flow from a welding current source, said system including in combination, transformer means having first, second and third inductively coupled windings, first circuit means including said first winding for connecting the welding current source to the electrode and the workpiece and forming a complete circuit from the welding current source to the electrode and the workpiece and through an arc therebetween, second circuit means including first capacitor means, means for charging said first capacitor means and first switch means selectively connecting said first capacitor means to said first circuit means, third circuit means including second capacitor means, means for charging said second capacitor means, and second switch means selectively connecting said second capacitor means to said third winding for providing current flow through said third winding to develop voltage pulses in said first and second windings, said first circuit means applying said voltage pulse in said first winding between the electrode and the workpiece to initiate an arc therebetween, said second winding being connected to said first switch means and actuating the same in response to said voltage pulse to apply current from said first capacitor means through said first circuit means to the welding electrode and the workpiece to increase current flow through the arc therebetween.

9. An arc starting system in accordance with claim 8 further including control means including relay means for operating said first switch means, second switch means having contacts for bridging said first winding and delay means coupling said second switch means to said relay means for operating said second switch means after the arc is established between the electrode and the workpiece.

References Cited
UNITED STATES PATENTS 3,154,719   10/1964   Sommeria _____ 315—163

JOHN W. HUCKERT, *Primary Examiner.*

D. O. KRAFT, A. M. LESNIAK, *Assistant Examiners.*